(12) United States Patent
Liechti et al.

(10) Patent No.: US 8,298,418 B2
(45) Date of Patent: Oct. 30, 2012

(54) METHOD AND INSTALLATION FOR BRINGING OZONE INTO CONTACT WITH A FLOW OF LIQUID, IN PARTICULAR A FLOW OF DRINKING WATER OR WASTEWATER

(75) Inventors: Pierre-André Liechti, Regensdorf (CH); Urbain Genier, Notre-Dame-De-L'Ile-Perrot (CA); Jacques Moles, Rucil-Malmaison (FR)

(73) Assignee: Degremont, Paris la Defense (FR)

( * ) Notice: Subject to any disclaimer, the term of this patent is extended or adjusted under 35 U.S.C. 154(b) by 635 days.

(21) Appl. No.: 12/439,935

(22) PCT Filed: Sep. 5, 2007

(86) PCT No.: PCT/FR2007/001438
§ 371 (c)(1),
(2), (4) Date: Aug. 27, 2009

(87) PCT Pub. No.: WO2008/029027
PCT Pub. Date: Mar. 13, 2008

(65) Prior Publication Data
US 2010/0018932 A1 Jan. 28, 2010

(30) Foreign Application Priority Data
Sep. 8, 2006 (FR) ..................................... 06 07882

(51) Int. Cl.
*C02F 1/78* (2006.01)
(52) U.S. Cl. ..................... 210/220; 210/760; 366/178.3; 261/DIG. 42
(58) Field of Classification Search ............... 210/747.5, 210/760, 764, 170.2, 170.3, 170.9, 170.1, 210/170.11, 192, 220, 205, 219; 366/178.3; 261/DIG. 42, DIG. 75
See application file for complete search history.

(56) References Cited

U.S. PATENT DOCUMENTS

| | | | |
|---|---|---|---|
| 4,507,253 A | 3/1985 | Wiesmann | |
| 5,273,664 A * | 12/1993 | Schulz | 210/220 |
| 5,397,480 A * | 3/1995 | Dickerson | 210/752 |
| 6,001,247 A | 12/1999 | Schulz | |
| 2005/0218085 A1 | 10/2005 | Song | |

FOREIGN PATENT DOCUMENTS
DE 1940458 A1 5/1970
(Continued)

OTHER PUBLICATIONS

Espacenet.com: bibliographic data for CH 564966 to Sauter (1975) (obtained from espacenet 11-11).*

*Primary Examiner* — Lucas Stelling
(74) *Attorney, Agent, or Firm* — Connolly Bove Lodge & Hutz LLP

(57) ABSTRACT

Method for bringing ozone into contact with a flow of liquid in which a fraction of the liquid flow is tapped off, a carrier gas laden with ozone is injected into the tapped-off flow, forming gas bubbles, the gas bubbles and the liquid are mixed so as to form a two-phase tapped-off flow, and the tapped-off flow is reintroduced into a descending vertical stream of the main liquid flow, this vertical stream undergoing, at the bottom, a change of direction to essentially the horizontal, the reintroduction of the tapped-off flow being carried out at the lower end of an injection tube immersed in the descending vertical stream of the main flow. The descending vertical stream (3a) forms a continuous liquid column, static mixing is provided in the injection tube (16) as far as the vicinity of its outlet, and the two-phase tapped-off flow is reintroduced into the descending vertical stream (3a) in the form of at least one jet having a vertically downward velocity component, this reintroduction taking place below a height (H) of liquid and with a vertically downward velocity component that are sufficient for the gas bubbles to be entrained downwards, without rising.

10 Claims, 3 Drawing Sheets

FOREIGN PATENT DOCUMENTS

| EP | 0086019 B1 | | 4/1986 |
| EP | 1380537 A | | 1/2004 |
| GB | 1362789 A | | 8/1974 |
| GB | 1446998 A | * | 8/1976 |

* cited by examiner

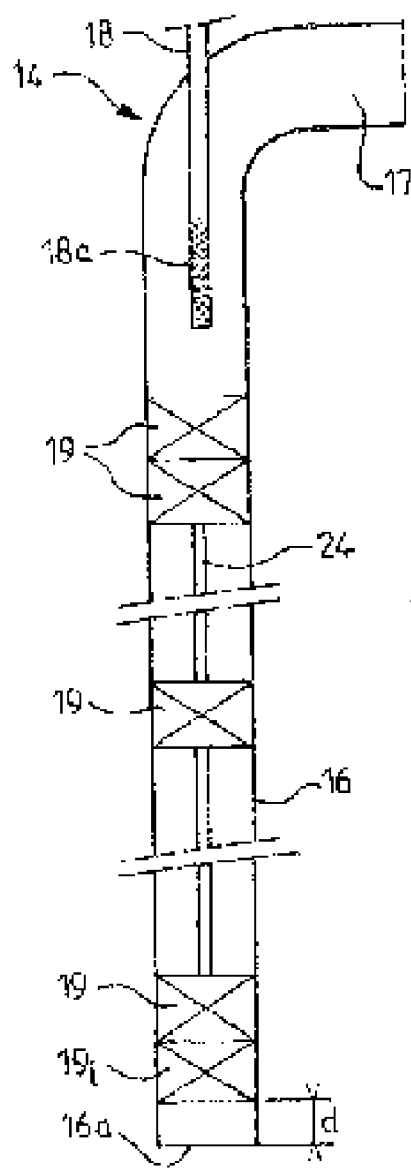
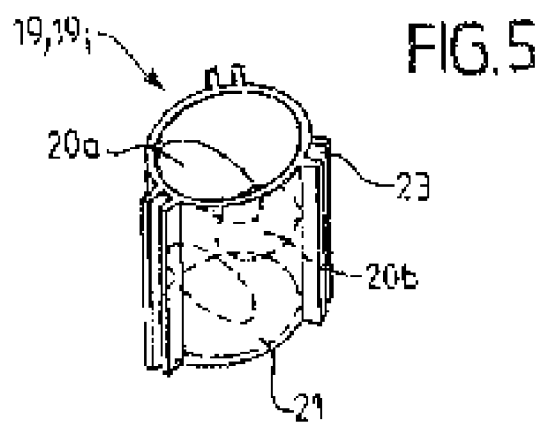
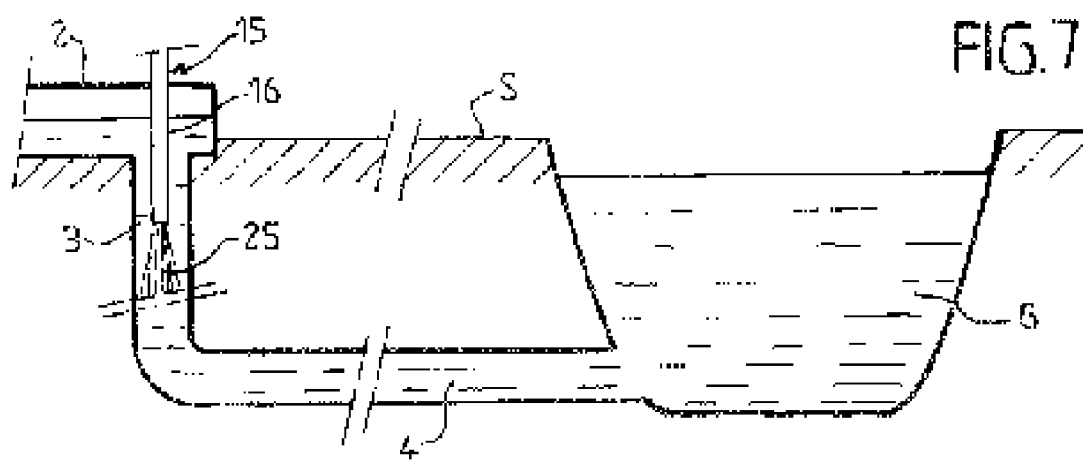
FIG. 4
FIG. 5
FIG. 6
FIG. 7

METHOD AND INSTALLATION FOR BRINGING OZONE INTO CONTACT WITH A FLOW OF LIQUID, IN PARTICULAR A FLOW OF DRINKING WATER OR WASTEWATER

CROSS REFERENCE TO RELATED APPLICATIONS

This application is a National Phase filing under 35 U.S.C. §371 of PCT/FR2007/001438 filed Sep. 5, 2007, which claims priority to Patent Application No. 06 07882, filed in France on Sep. 8, 2006. The entire contents of each of the above-applications are incorporated herein by reference.

The invention relates to a method for bringing ozone into contact with a stream of liquid, in particular a stream of drinking water or wastewater, for the purpose of treating it with ozone.

FR 2 762 232 discloses a method and a device for bringing ozone into contact with liquids, especially water, in which a two-phase mixture of the liquid stream to be treated and of an ozone-laden gas is produced and sent into an apparatus for dissolving the ozone in the liquid, such as a U-tube. Although this method gives beneficial results, it does not properly control the water/gas two-phase mixture since the flow rate of the liquid stream to be treated into which the gas is injected is variable. Furthermore, the conditions under which the liquid to be treated and the ozone-laden gas are mixed together does not provide for the diameter of the gas bubbles at the inlet of the dissolution apparatus to be controlled. In addition, the device for implementing this method requires substantial and expensive civil engineering structures.

EP 0 086 019 also relates to a method and a device for bringing ozone into contact with a stream of liquid to be treated. According to that document, a fraction of the liquid stream is tapped off, a carrier gas—air and/or oxygen—laden with ozone is injected into the tapped-off stream, forming gas bubbles, the gas bubbles and the liquid are mixed together to form a two-phase tapped-off stream and the tapped-off stream is reintroduced into a descending vertical flow of the main liquid stream. This vertical flow undergoes at the bottom a change of direction essentially to the horizontal. The tapped-off stream is reintroduced at the lower end of an injection tube immersed in the descending vertical flow of the main stream. This device also requires substantial civil engineering structures so as to produce a cylindrical tank having, at the top, a trickling plate with a free space constituting a degassing stage and creating an interruption in the liquid flow between the bottom of the tank and the top. The descending flow forms at the bottom. A not insignificant proportion of bubbles rises to the surface of the liquid lying in the bottom of the tank and escapes into the degassing stage and then to the outside, so that the efficiency of ozone dissolution is thereby reduced.

One object of the invention is in particular to provide a method for bringing ozone into contact with a liquid stream which makes it possible to substantially improve the efficiency of ozone dissolution into the liquid to be treated. Another object of the invention is to provide a method which, in order to implement it, does not require substantial specific civil engineering structures, and preferably makes it possible to use installations already in place for collecting and/or discharging drinking water or wastewater.

According to the invention, a method for bringing ozone into contact with a liquid stream, in particular a stream of drinking water or wastewater, for the purpose of treating it with ozone, in which a fraction of the liquid stream is tapped off, a carrier gas—air and/or oxygen—laden with ozone is injected into the tapped-off stream, forming gas bubbles, the gas bubbles and the liquid are mixed together to form a two-phase tapped-off stream and the tapped-off stream is reintroduced into a descending vertical flow of the main liquid stream, this vertical flow undergoing, at the bottom, a change of direction essentially to the horizontal, the tapped-off stream being reintroduced at the lower end of an injection tube immersed in the descending vertical flow of the main stream, is characterized in that:
  the descending vertical flow forms a continuous liquid column;
  static mixing is provided in the injection tube down to close to its outlet in order to keep the diameter of the bubbles below a predetermined value; and
  the two-phase tapped-off stream is reintroduced into the descending vertical flow in the form of at least one jet having a downwardly vertical velocity component, this reintroduction taking place below a liquid height and with a downward vertical velocity component that are sufficient for the gas bubbles to be downwardly entrained without them rising.

Preferably, the two-phase tapped-off stream is reintroduced into the main stream cocurrently in the form of a jet directly vertically downward from a sufficient height above the change of direction so that the jet spreads out over the entire horizontal cross section of the descending vertical flow. Advantageously, the jet of tapped-off flow reintroduced is a free jet. The cone half-angle of the jet is generally from 15° to 20°.

The flow rate of the tapped-off stream is kept approximately constant, irrespective of the variation in the flow rate of the main stream, the flow rate of the tapped-off stream being chosen so as to accept the ozone dose needed to ensure treatment of the maximum volume of the main stream.

Preferably, the descending vertical velocity component of the two-phase stream at the outlet of the injection tube is greater than 3 m/s. The two-phase stream is reintroduced below a liquid height of at least 10 meters.

The diameter of the bubbles at the outlet of the injection tube is less than 5 mm, preferably equal to or less than 2 mm.

The descending vertical flow may be located in a vertical liquid outflow pipe which is joined at its lower end to an approximately horizontal pipe. This horizontal pipe may be joined to a vertical riser or may open into a receiving structure, for example a river or lake.

The invention also relates to an installation for implementing the method defined above.

Such an installation comprises an inflow channel for the liquid to be treated, a descending vertical pipe forming a shaft toward the end of the inflow channel, the descending pipe being joined, at the bottom, to an approximately horizontal pipe, pumping means being provided for withdrawing a tapped-off fraction of the stream upstream of the descending vertical pipe and for directing the tapped-off stream toward a mixing assembly, receiving a gas—air and/or oxygen—laden with ozone, this installation being characterized in that:
  the mixing assembly is placed at the top of a vertical injection tube which is immersed in the descending vertical pipe, which pipe is free of any obstacles so that the descending vertical flow forms a continuous liquid column; and
  the vertical injection tube includes, near its lower end, a static mixer for keeping the diameter of the bubbles below a predetermined value, and its lower end includes at least one opening for reintroducing the two-phase tapped-off stream into the descending vertical flow in the form of at least one jet having a downwardly vertical velocity component, the length of the injection tube and the outlet opening of the jet both being provided so that the reintroduction takes place below a liquid height and with a downwardly vertical velocity component that are sufficient for the gas bubbles to be entrained downward, without them rising.

Preferably, the static mixer is at least 50 cm from said lower end of the injection tube.

Preferably, the injection opening of the tube is downwardly directed and the two-phase tapped-off stream is reintroduced into the main stream cocurrently in the form of a jet directed vertically downward from a sufficient height above the change of direction so that the jet spreads out over the entire horizontal cross section of the descending vertical flow.

Advantageously, the injection tube is open over its entire lower cross section and the jet of tapped-off stream reintroduced is a "free jet".

Several static mixers are generally distributed in the injection tube. These static mixers may be removably fitted. Each static mixer may be of the type having baffles formed by oppositely inclined plates placed in cylindrical sleeves.

The installation includes means for keeping the flow rate of the tapped-off stream approximately constant, irrespective of the variation in the flow rate of the main stream, the flow rate of the tapped-off stream being chosen so as to accept the ozone dose needed to ensure treatment of the maximum volume of the main stream.

The length of that part of the injection tube which is immersed in the liquid column is at least 10 meters.

Advantageously, the descending vertical pipe consists of an already existing structure, especially a wastewater drain pipe or a drinking water pipeline, which is extended by a horizontal pipe, the latter rising via another, ascending vertical pipe. According to another possibility, the horizontal pipe opens into a river or a lake or a water retaining structure.

Apart from the arrangements presented above, the invention consists of a number of other arrangements which will be explained in more detail below with regard to exemplary embodiments described with reference to the appended drawings, which are in no way limiting. In these drawings:

FIG. 4 is a schematic cross-sectional view on a larger scale of an injection tube according to the invention;

FIG. 5 is a schematic perspective view on a larger scale of an example of a static mixer having baffles;

FIG. 6 is a horizontal cross section of the injection tube; and

FIG. 7 is a schematic vertical cross section of an alternative installation according to the invention.

Figure 1:
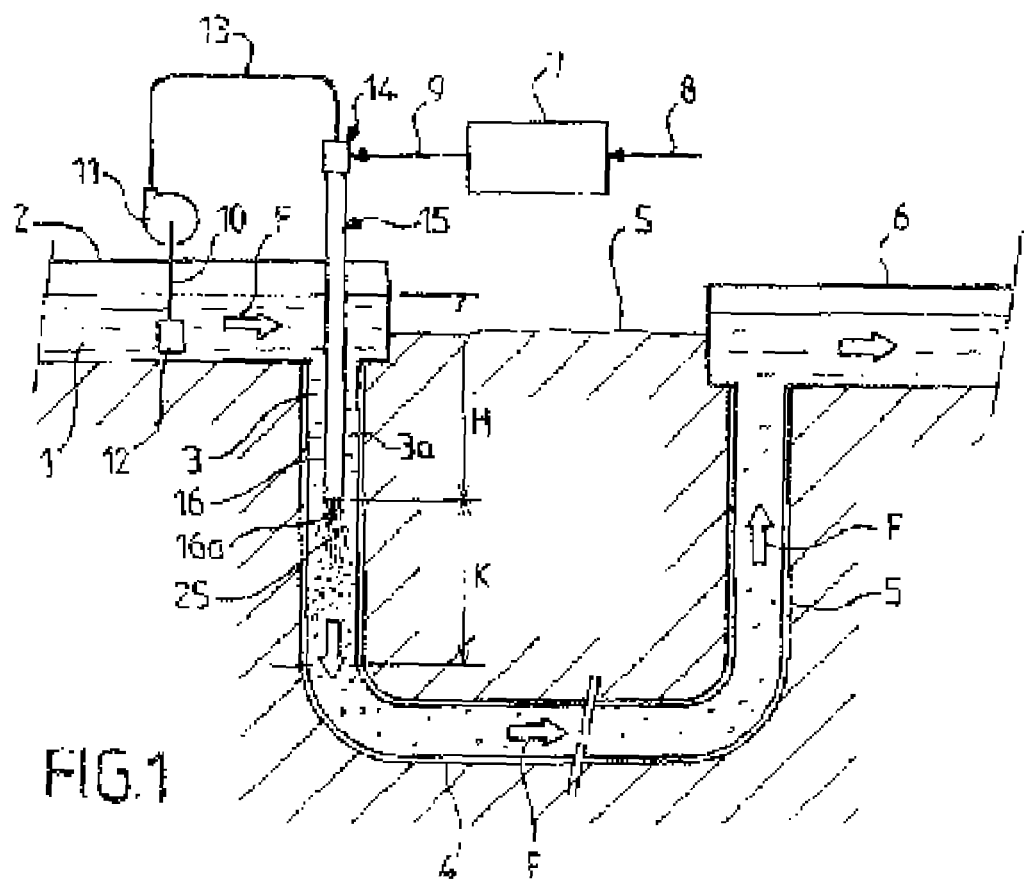
FIG. 1 is a schematic vertical cross section through an installation for implementing the method of the invention.
Figure 2:
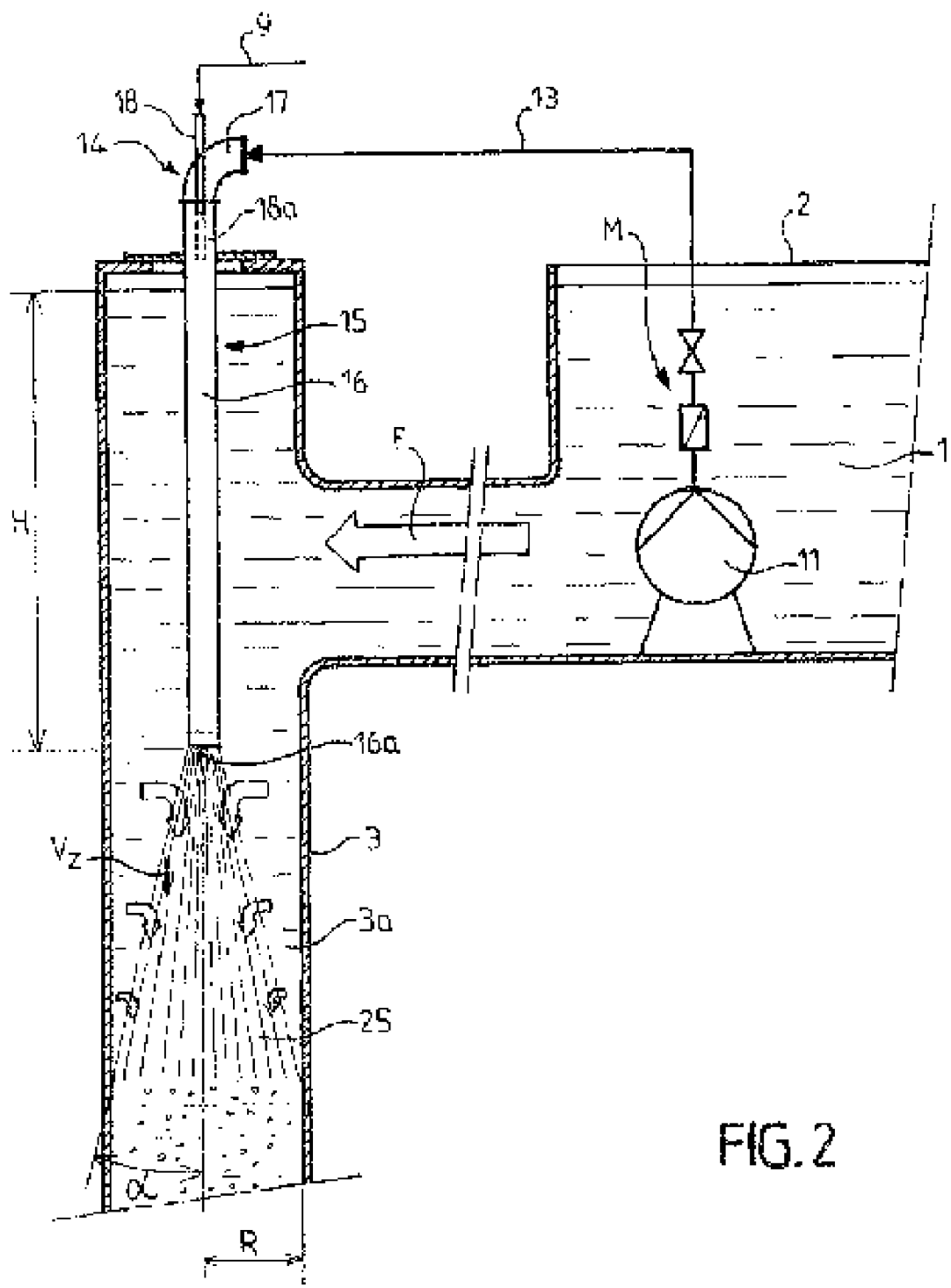
FIG. 2 is a vertical cross section on a larger scale of part of an installation similar to that of FIG. 1, the diagram of FIG. 2 being rotated through 180° about a vertical axis with respect to that of FIG. 1.

The figures, especially FIGS. 1 and 2, show an installation for implementing a method according to the invention for bringing ozone into contact with a liquid to be treated. In the example shown, the liquid consists of municipal or industrial wastewater, arriving as a main stream 1 in a channel 2, which is closed or open and is slightly sloping in order to allow outflow under gravity. The channel 2, toward its end, opens above a descending vertical pipe 3 forming a shaft. The descending vertical pipe 3 is free of any obstacle in its cross section so that the descending vertical flow 3a forms a continuous liquid column.

The pipe 3 is joined at its lower end to an approximately horizontal pipe 4, which is slightly sloping in order to promote outflow. The liquid flow thus undergoes a 90° change of direction. According to the diagram shown in FIG. 1, the pipe 4 is joined at its lower end to a vertical ascending pipe 5 which opens at the top into a channel 6, which is closed or open to the air and is slightly inclined to the horizontal.

By way of nonlimiting example, the flow rate of the main stream 1 may be greater than 20 m$^3$/s. The height of the vertical pipe 3 may exceed 50 meters so that the horizontal pipe 4 is at a depth of about 50 m below the ground level S. The diameter of the pipes 3, 4 and 5 is adapted to the flow rate of liquid to be discharged and may be around several meters, especially about 6 meters.

The combination of pipes 3, 4, 5 forms a kind of U, it being specified that the length of the horizontal pipe 4 may be large, for example several kilometers.

It should also be noted that the system comprising channels 2, 6 and pipes 3, 4 and 5 corresponds to an installation already in place for discharging wastewater. According to another possibility, this system may correspond to a drinking water pipeline.

For the ozone-based treatment using the method according to the invention, the installation includes at least one ozone generator 7 fed with a carrier gas 8 consisting of dry air or of oxygen, or an air/oxygen mixture, outputting at 9 an ozone-rich carrier gas under relative pressure, especially about 1.5 bar.

A partial stream 10 of the liquid to be treated is withdrawn from the main stream 1 by a pump 11, if necessary through a filter 12. The proportion of the stream withdrawn may be about 5% of the main stream. However, this proportion may be between 1% and 40%, preferably between 5% and 20%. The pump 11 may be submerged, as illustrated in FIG. 2. The pump 11 outputs the partial stream into a pipe 13 joined to a mixing element 14, for mixing the tapped-off liquid stream 10 and the ozone-rich gas arriving via the pipe 9 connected to the element 14. The mixing element 14 is placed at the top of an apparatus 15 for dissolving the ozone and its carrier gas in the liquid, this apparatus 15 operating according to the "static mixing" principle.

The apparatus 15 includes a cylindrical injection tube 16 (FIG. 2) which runs approximately coaxially into the pipe 3. The lower end of the tube 16 is located at a depth H, below the liquid level in the channel 1, sufficient to create a hydrostatic pressure of around at least 1 bar. This height H, which corresponds to the length of the tube immersed in the liquid, is about at least 10 m. The tube 16 passes through the channel 2 so as to be immersed in the pipe 3, the top of the tube 16 being located above the water level in the channel 1.

As may be seen in FIG. 2, the mixing element 14 includes an elbow 17 for joining the horizontal delivery pipe 13 of the pump 11 to the vertical tube 16. This elbow 17 is penetrated by a vertical nozzle 18, coaxial with the tube 16, joined at the top to the ozone-rich gas inflow pipe 9. The lower part of the nozzle 18 is located in the tube 16 and closed axially by a wall that includes flow orifices for the gas, such orifices also being provided on the cylindrical wall of the nozzle. As a variant, the mixing element 14 may consist of a hydro-ejector.

The tube 16 has, on the inside, below the mixing element 14, several static mixers 19 (see FIG. 4), preferably having baffles, which are removably distributed along the length of the tube.

The last static mixer 19i toward the bottom (FIG. 4) is located close to the bottom end of the tube 16. The distance d between the bottom end and the mixer 19i is preferably less than 50 cm.

The mixers 19, 19i may include oppositely inclined plates 20a, 20b (FIG. 5) in order to form opposed deflectors, while still being oriented along the outflow direction of the liquid. The plates 20a, 20b are placed inside cylindrical sleeves 21 mounted so as to slide inside the tube 16. The plates 20a, 20b form baffles promoting control of the diameter of the gas bubbles and mixing of these bubbles with the liquid. The mixers 19, 19i may be fitted into the tube 16 slidingly using longitudinal rails 22 fastened to the inside wall of the tube 16, these being suitable for engaging in grooves 23 provided on the periphery of the sleeves 21. Three rails 22 distributed at 120° may be provided, as shown in FIG. 6, to which three grooves 23 correspond.

The various static mixers 19 distributed over the length of the tube 16 are joined together by a central rod 24 in order to form an assembly that is easy to fit and dismantle, especially for cleaning.

The tube 16 is open at the bottom over its entire cross section so that the dissolution apparatus 15 produces a vertically downward "free jet" 25 of the two-phase stream. This jet 25 progressively spreads out. The cone half-angle $\alpha$ (FIG. 2) of the jet 25 is generally around 15° to 20° to the axial direction of the jet. The distance K between the bottom end of the tube 16 and the start of the elbow joining the pipe 3 is sufficient for the free jet to spread out over the entire horizontal cross section of the pipe 3 and completely mix with the main fluid in the descending pipe 3 before the change of direction. Denoting the diameter of the pipe 3 by R, the distance K must be greater than R/tan $\alpha$, i.e. around 11 m for R equal to 3 m.

The vertical component $V_Z$ (FIG. 2) of the outlet velocity of the jet at the bottom end of the tube 16 is a descending component and is at least 3 m/s. The diameter of the gas bubbles, which are essentially spherical, is less than 5 mm and preferably less than 2 mm. These conditions, combined with a sufficient hydrostatic pressure due to the depth H, mean that the gas bubbles are downwardly entrained, with almost complete progressive dissolution of the ozone and its carrier gas in the liquid. Almost complete progressive disappearance of the two-phase nature is obtained. At the bottom of the pipe 3 only carrier gas bubbles subsist, the ozone content of which is greatly reduced or even zero. The depth H+K of the vertical inlet shaft is sufficient to guarantee good mixing and efficient dissolution of the ozone and its carrier gas.

Although the injection in the form of a vertically downward "free jet" is preferred, it would be possible to provide an annular outlet at the bottom end of the tube 16 so that the jet has the form of a hollow cone of vertical axis. The axis of the jet could even make an angle to the vertical direction, insofar as the descending vertical velocity component, for the injection directions furthest from the vertical, is at least 3 m/s.

In general, the outlet velocity of the jet at the bottom end of the tube 16 is preferably at least eight times greater than the ascensional vertical velocity of the bubbles.

The approximately horizontal part corresponding to the pipe 4 may have any length. This section helps, if necessary, to complete the dissolution of the ozone in the liquid. The vertical outlet shaft 5 may have any height and feed an outlet and/or discharge structure, such as a lake, a river, a canal or any other receiving structure.

The hydrodynamic characteristics of the U-tube formed by the combination of pipes 3, 4 and 5, injection tube 16 and free jet 25 are designed to ensure single-phase and two-phase fluid velocities that are sufficient to guarantee that a "plug flow" is maintained. A plug flow is a flow such that the liquid particles located in a plane orthogonal to the overall velocity of the flow all have the same velocity and remain in this plane.

Denoting the ozone dose expressed by weight needed to treat 1 m³ of liquid by p grams/m³ and denoting the maximum flow rate of the main stream to be treated, expressed in m³/s, by $Q_{max}$, then the maximum ozone flow rate that the tapped-off stream must accept is equal to $p \times Q_{max}$. Denoting the proportion by weight (which may be around 12%) of ozone in the carrier gas by $\beta$, the mass flow rate of carrier gas for introducing ozone with the maximum flow rate will be obtained by the formula $p \times Q_{max}/\beta$. If the tapped-off liquid stream can accept a mass proportion $\gamma$ of ozone-laden gas, the flow rate of the tapped-off stream Qdv for treating the maximum volume of the main stream will be $p \times Q_{max}/\beta\gamma$.

The flow rate of the tapped-off stream will be maintained at this approximately constant value, which will be sufficient for the maximum flow rate $Q_{max}$, and is advantageous for lower flow rates of the main stream.

The ozone dose used to purify the water may vary from about 15 mg/l, i.e. 15 g/m³, in the case of municipal water up to 200 mg/l, i.e. 200 g/m³, in the case of industrial water. In the case of drinking water treatment, the typical dose is from 2 to 5 mg/l, i.e. 2 to 5 g/m³.

Means M, comprising for example a manual adjustment valve and a flow rate indicator, are provided for keeping the flow rate of the tapped-off stream at the abovementioned constant value, irrespective of the variation in the flow rate of the main stream 1. This allows the injection of the ozone-rich gas into the liquid stream to be properly controlled, in order to control the bubble diameter.

The advantage of ozone for treating water stems in particular from the fact that ozone not only ensures that the water is disinfected but also that perturbing elements, such as endocrine species (hormones), colorants, foam or hard COD, are oxidized. Furthermore, ozone destroys the pollution instead of effecting a simple chemical displacement thereof.

The operation of the installation is as follows.

The flow of liquid takes place along the arrows F of FIG. 1. The main stream of water to be treated arriving via the channel 1 descends, in the form of a continuous liquid column, in the vertical pipe 3 where the tube 16 injecting an ozone-rich two-phase partial stream is placed. This two-phase stream is carried to the bottom of the pipe 3 by the descending stream of water to be treated and is completely mixed with said stream through the effect of the free jet 25. The free jet exiting the tube 16 with a velocity of around 3 to 4 m/s loses velocity by spreading out so as to end up with a downwardly directed velocity of around 0.3 m/s sufficient, in combination with the hydrostatic pressure, to prevent bubbles from rising and preventing a gas retention effect.

Figure 3:
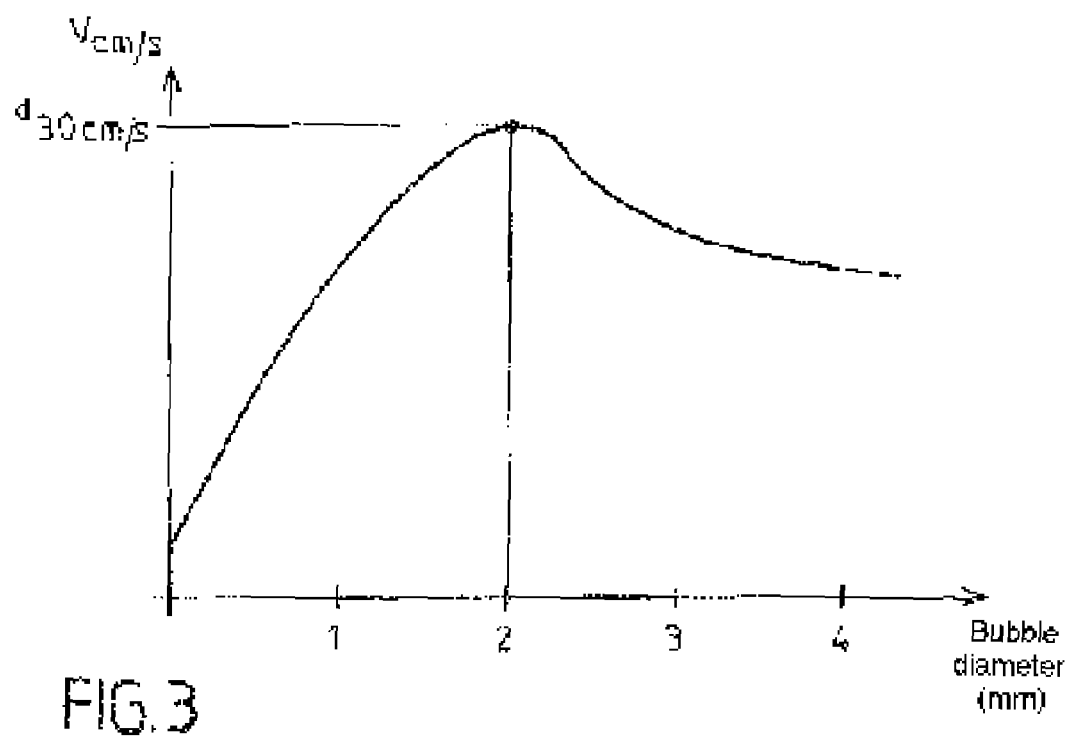
FIG. 3 is a curve illustrating the variation in the ascensional velocity, plotted on the y-axis, of a gas bubble in the water, the bubble diameter being plotted on the x-axis.

The injection tube 16 with the mixers 19, 19i is designed so that, with clean water, at the outlet of the last mixer 19i close to the outlet of the tube 16, the diameter of the approximately spherical gas bubbles in the liquid is about 2 mm. In the case of a wastewater containing organic matter, because of the different surface tension relative to clean water, the diameter of the bubbles will be even smaller. The curve of FIG. 3 shows that a bubble diameter of 2 mm corresponds to a maximum ascensional velocity of the bubbles in the liquid, this maximum corresponding to approximately 30 cm/s. Since the downward entrainment velocity of the bubbles is greater than this maximum, the bubbles do not rise. The increase in the hydrostatic pressure accompanied by the dissolution of the gas in the liquid causes a reduction in their diameter. For bubble diameters greater than 2 mm, the bubbles have a tendency to deform and not remain spherical. For bubble diameters less than 2 mm, the spherical shape of the bubbles is preserved with a reduced ascensional velocity.

The controlled shear caused in the injection tube 16 by the "static" mixing and the baffles of the mixers 19, 19i results in the formation of small bubbles in the partial stream, the diameter of which bubbles may vary between 0.5 and 5 mm and may be calibrated, depending on the quality of the fluid to be treated. In the region of the free jet 25 in the downward vertical pipe, downstream of the outlet of the tube 16 and in the rest of the lower part of the vertical pipe 3, the residual ozone in the gas phase is transferred into solution in the descending stream of water to be treated, as is also some of the carrier gas. The extent of this solution will vary depending on the quantity of ozone charged into the water to be treated, on the concentration of ozone in its carrier gas and on the type of carrier gas.

When the carrier gas is oxygen, this effect is particularly evident, going as far as its almost complete dissolution.

In the vertical pipe 3, the flow at every point is of the "plug flow" type, that is to say the liquid progresses as planes perpendicular to the flow axis. In the horizontal part 4, the flow remains of the "plug flow" type even if a cushion of carrier gas forms at the top of the pipe 4. In the vertical outflow pipe 5, the flow will lose its "plug flow" character because of the fact that some of the carrier gas will be vented, but without ozone completely dissolved in the liquid.

Because the flow in the vertical inlet pipe 3 and in the horizontal part 4 of the U-tube is of the "plug flow" type, it may be stated that the ratio $T_{10}/T_h$ (where $T_{10}$ is the time to output 10% of the amount of ozone injected and $T_h$ is the "hydraulic residence" time equal to the sum of the volumes of the vertical inlet pipe 3 and of the horizontal pipe 4 divided by the liquid flow rate) is very close to the value 1. This has the consequence that the volume of the structure in question for a given "$CT_h$," can thus be substantially reduced compared with any system not having as pronounced a flow of the "plug flow" type, C is the average residual concentration of ozone during the time period $T_h$. In the ascending part 5, the gas bubbles may have a terminal ascensional velocity greater than the velocity of the liquid, it being possible for these velocity differences to disturb the flow, thus affecting the "plug flow" character of the system.

In practice, in an installation where the outlet 16a of the tube 16 is located at a depth H of about 10 m, the ozone is entirely dissolved in the liquid at a depth of about 35 m. This complete ozone dissolution obviates the need for an ozone destroyer at the head of the outlet channel 6 since the carrier gas capable of venting in the vertical riser 5 no longer contains ozone.

As already indicated, although all the carrier gas cannot be dissolved in the liquid, the bubbles however decrease in diameter and are kept in suspension in the liquid like solid matter.

As a nonlimiting example, in the case of a 21 m³/s main stream, the flow rate of the tapped-off stream is about 0.8 m³/s and the internal diameter of the tube 16 is 0.6 m (60 cm).

The spreading of the jet 25 causes the bubbles to spread and prevents any coalescence.

FIG. 7 is a diagram of an alternative embodiment in which the horizontal pipe 4 instead of being extended by an ascending pipe 5 runs into the bottom of a river G or a lake or another receiving structure.

It should be noted that the installation and the method proposed create practically no pressure drop, but simply a bubble curtain.

The invention claimed is:

1. An installation comprising:
    an inflow channel (2) for a liquid stream to be treated,
    a descending vertical pipe (3) forming a shaft toward an end of the inflow channel, the descending vertical pipe being directly joined, at a bottom of the vertical pipe, to an approximately horizontal pipe (4),
    pumping means (11) being provided for withdrawing a tapped-off fraction of the liquid stream upstream of the descending vertical pipe and for directing the tapped-off stream toward a mixing assembly (14), receiving a gas—air and/or oxygen—laden with ozone; and producing a two-phase trapped off stream, wherein:
        the mixing assembly (14) is placed at the top of a vertical injection tube (16) which is immersed in the descending vertical pipe (3), which pipe is free of any obstacles so that a descending vertical flow (3a) forms a continuous liquid column; and
        the vertical injection tube (16) includes, near a lower end, a static mixer (19i) for keeping bubble diameters below a predetermined value, and its lower end includes at least one opening (16a) for reintroducing the two-phase tapped-off stream into the descending vertical flow in the form of at least one jet (25) having a downwardly vertical velocity component ($V_z$),
        the length of the injection tube (16) and the outlet opening (16a) of the jet both being provided so that the reintroduction takes place below a liquid height (H) and with a downwardly vertical velocity component ($V_z$) that are sufficient for the gas bubbles to be entrained downward, without them rising in the descending vertical flow of the liquid stream.

2. The installation as claimed in claim 1, wherein the static mixer (19i) is at least 50 cm from the lower end of the injection tube (16).

3. The installation as claimed in claim 1, wherein the injection opening (16a) of the tube is downwardly directed and the two-phase tapped-off stream is reintroduced into the descending vertical flow cocurrently in the form of a jet (25) directed vertically downward from a sufficient height (K) above the approximately horizontal pipe so that the jet spreads out over the entire horizontal cross section of the descending vertical flow.

4. The installation as claimed in claim 3, wherein the injection tube (16) is open over its entire lower cross section.

5. The installation as claimed in claim 1, wherein several static mixers (19) are distributed in the injection tube and are removably fitted.

6. The installation as claimed in claim 5, wherein each static mixer (19, 19i) comprises baffles formed by oppositely inclined plates placed in cylindrical sleeves.

7. The installation as claimed in claim 1, wherein it includes means (M) for keeping a flow rate of the tapped-off stream approximately constant, irrespective of variations in the flow rate of the liquid stream, the flow rate of the tapped-off stream being chosen so as to accept an ozone dose needed to ensure treatment of a maximum volume of the liquid stream.

8. The installation as claimed in claim 1, wherein the length of that part of the injection tube (16) which is immersed in the liquid column is at least 10 meters.

9. The installation as claimed in claim 1, wherein the descending vertical pipe (3) consists of a pre-existing structure which is extended by the approximately horizontal pipe (4).

10. The installation as claimed in claim 9, wherein the pre-existing structure comprises a wastewater drain pipe or a drinking water pipeline.

* * * * *